United States Patent [19]

Snyder

[11] Patent Number: 4,536,123
[45] Date of Patent: Aug. 20, 1985

[54] HAND TRUCK APPARATUS FOR ELEVATING AND TRANSPORTING AN OBJECT

[76] Inventor: Wayne E. Snyder, 11122 Township Rd. 180, Findlay, Ohio 45840

[21] Appl. No.: 520,411

[22] Filed: Aug. 4, 1983

[51] Int. Cl.³ .............................................. B60P 1/00
[52] U.S. Cl. ................................. 414/448; 254/2 R; 254/8 R; 254/10 R
[58] Field of Search ............ 254/8 R, 8 B, 7 R, 7 B, 254/2 R, 2 B, 10 R, 10 B, 124; 414/444, 448, 490

[56] References Cited

U.S. PATENT DOCUMENTS

| | | | |
|---|---|---|---|
| 1,751,480 | 3/1930 | Howell | 254/10 R |
| 2,570,741 | 10/1951 | Zeh | 254/8 R |
| 3,086,664 | 4/1963 | Gribble | 414/448 |
| 3,271,006 | 9/1966 | Brown et al. | 254/2 B |
| 3,315,571 | 4/1967 | Hott et al. | 254/2 B |
| 3,326,311 | 6/1967 | Jung | 254/2 R |
| 3,508,746 | 4/1970 | Lindsay | 269/17 |

FOREIGN PATENT DOCUMENTS

| | | | |
|---|---|---|---|
| 207695 | 7/1959 | Austria | 414/448 |
| 2033504 | 1/1972 | Fed. Rep. of Germany | 254/8 R |

Primary Examiner—Robert C. Watson
Attorney, Agent, or Firm—Fraser & Clemens

[57] ABSTRACT

The present invention relates to a hand truck apparatus which is designed for transporting large cylindrical objects such as compressed gas storage tanks, for example. The hand truck apparatus includes a main frame assembly supported by a pair of spaced apart ground engaging wheels. A load supporting mechanism is movably mounted on the main frame assembly and includes a securing strap adapted to surround the object and urge the object into secure engagement with the load supporting mechanism. A hydraulic jack unit is provided for moving the load supporting mechanism and the object between a lower position and a selected upper position.

6 Claims, 3 Drawing Figures

HAND TRUCK APPARATUS FOR ELEVATING AND TRANSPORTING AN OBJECT

BACKGROUND OF THE INVENTION

The present invention relates generally to a hand truck apparatus for transporting an object and, in particular, to a hand truck apparatus which includes means for elevating the object to be transported.

Hand trucks are widely used to assist an operator in transporting a relatively heavy or cumbersome object from one location to another. Typically, hand trucks include a generally vertical frame supported by ground engaging wheels or rollers, and a lower tongue portion attached to the extreme lower end of the frame which is adapted to be inserted under a portion of the object to be transported. Once the tongue has been inserted under the object, the hand truck and the object are simultaneously tilted rearwardly such that the object rests against the vertical frame and the majority of the weight of the object is centered over the wheels. The hand truck can then be used to move the object to the desired location.

In some instances, the hand truck includes a strap means which can be used to encompass the upper end portion of the object for maintaining the object on the hand truck. Examples of hand trucks which include strap means are disclosed in the U.S. Pat. Nos. 2,949,314 and 3,907,138.

Also, some hand trucks are provided with means for elevating the lower tongue portion to lift the object to a desired height. Examples of hand trucks which include elevating means are disclosed in U.S. Pat. Nos. 2,415,655, 2,598,489, and 3,578,353.

SUMMARY OF THE INVENTION

The present invention relates to an improved hand truck apparatus for elevating and transporting an object. More specifically, the hand truck of the present invention includes a main frame assembly supported by ground engaging wheel means and having a load supporting mechanism movably mounted thereon. The load supporting mechanism includes means for engaging the sidewalls of the object to be transported and urging the object into secure engagement with the load supporting mechanism. The hand truck includes means for moving the load supporting mechanism and the object between a first lowered position and a second upper position. The hand truck can then be tilted rearwardly and used to move the object to the desired location.

It has been found that a hand truck apparatus constructed according to the present invention is especially desirable for use in transporting large cylindrical tanks, such as compressed gas storage tanks utilized to store acetylene or oxygen for welding operations. One of the reasons for this is due to the construction of a welding cart utilized to support the acetylene and oxygen tanks. The welding cart is typically provided with an elevated platform for supporting the lower ends of the tanks. Generally, the platform is provided with an upstanding flange portion which surrounds the periphery of the platform. Thus, in order to remove a tank from the cart or install a new tank on the cart, the tank must be lifted over the upstanding flange portion. However, since each tank is relatively heavy and difficult to handle, this can be a relatively difficult task.

Because the lower tongue portion of a conventional hand truck interferes with the upstanding flange portion when an operator attempts to insert the tongue portion under the tank, conventional hand trucks are typically not used for this purpose. Since the hand truck apparatus of the present invention can elevate an object between a lower position and an upper position without the use of a lower tongue portion which must be inserted under the tank, the present invention is ideally suited for transporting these types of storage tanks. Thus, with the present invention, the storage tank can be easily lifted from the associated welding cart and replaced with a new tank.

BRIEF DESCRIPTION OF THE DRAWINGS

The above, as well as other advantages of the present invention, will become readily apparent to one skilled in the art from reading the following detailed description in conjunction with the attached drawings, in which.

DESCRIPTION OF THE PREFERRED EMBODIMENT

Figure 1:
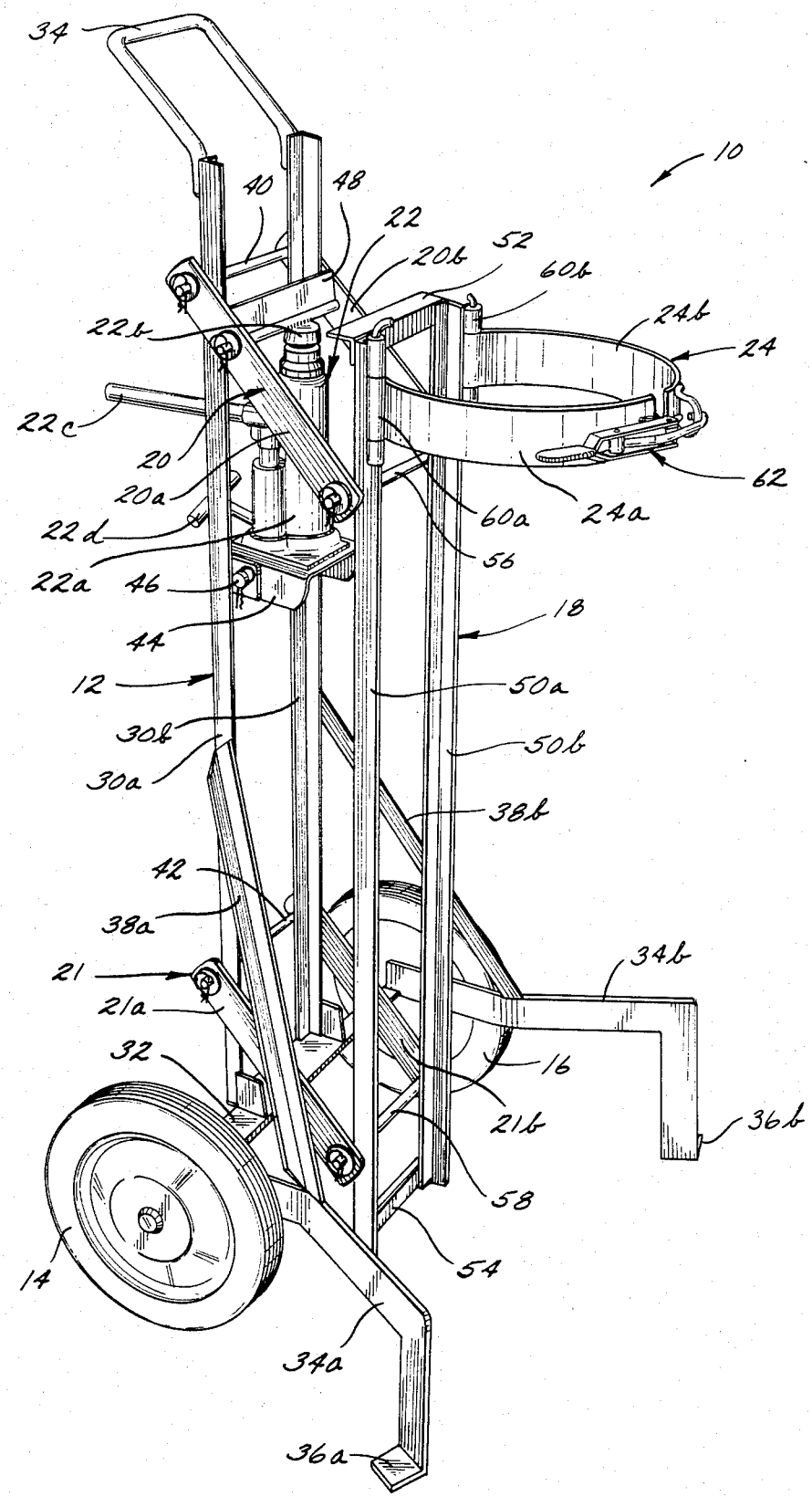
FIG. 1 is a perspective view illustrating a hand truck apparatus embodying the principles of the present invention.

Referring to FIG. 1, there is shown a perspective view of a hand truck apparatus 10 according to the present invention. The apparatus 10 includes a main frame assembly 12 which is supported by lower spaced apart ground engaging wheels 14 and 16. A load supporting mechanism 18 is movably mounted on the main frame assembly 12 by upper and lower linkage assemblies 20 and 21 respectively. A hydraulic jack unit 22 having a lower housing 22a supported by the main frame assembly 12 and a movable piston 22b adapted to pivot the upper linkage assembly 20 is utilized to move the load supporting mechanism 18 between a lower position and a desired upper position. The load supporting mechanism 18 includes a securing strap assembly 24 adapted to encompass an object (not shown) and urge the object into secure engagement with the load supporting mechanism 18.

The main frame assembly 12 includes a pair of parallel, spaced apart main support members 30a and 30b having their lower ends connected to a lower axle unit 32 and having their upper ends connected by means of a handle 34. The wheels 14 and 16 are rotatably mounted at the ends of the axle unit 32. A pair of spaced apart, diverging leg members 34a and 34b extend outwardly from the axle unit 32 and have lower ground engaging feet 36a and 36b respectively which, in conjunction with the wheels 14 and 16, function to maintain the main frame assembly 12 and the load supporting mechanism 18 in a generally vertical position. The leg members 34a and 34b are braced to the main frame members 30a and 30b by angle brackets 38a and 38b respectively.

The upper linkage assembly 20 includes individual linkage arms 20a and 20b which are pivotally mounted to the main frame assembly 12 by means of a pivot rod 40 secured to the support members 30a and 30b and pivotally attached to the ends of the linkage arms 20a and 20b. Similarly, the lower linkage assembly 21 includes individual arms 21a and 21b which are pivotally mounted to a pivot rod 42 secured to the main support members 30a and 30b.

The hydraulic jack unit 22 includes an operating handle 22c which, when actuated, causes the piston 22a to be extended upwardly from within the jack housing 22b. A release handle 22d is actuated to relieve the hydraulic fluid pressure and cause the piston 22a to retract to its lowered position. The lower end of the jack assembly 22 is mounted on a base platform 44 pivotally mounted between the main frame members 30a and 30b by trunion supports 46. The upper end of the piston 22a is welded to a lift member 48 which is pivotally mounted between the linkage arms 20a and 20b.

The load supporting mechanism 18 includes a pair of parallel, spaced apart frame members 50a and 50b which are maintained in spaced apart relationship by means of an upper link 52 and a lower link 54. The load supporting mechanism 18 is pivotally mounted to the linkage assembly 20 by means of a pivot rod 56 secured to the frame members 50a and 50b and pivotally attached to the arms 20a and 20b, and is pivotally mounted to the lower linkage assembly 21 by means of a pivot rod 58 secured to the frame members 50a and 50b and pivotally attached to the linkage arms 21a and 21b.

The securing strap assembly 24 includes two individual arcuate portions 24a and 24b each having one end thereof pivotally mounted to a respective one of the frame members 50a and 50b at 60a and 60b respectively, and having their opposite ends maintained adjacent one another by an adjustable latch mechanism 62.

Figure 3:
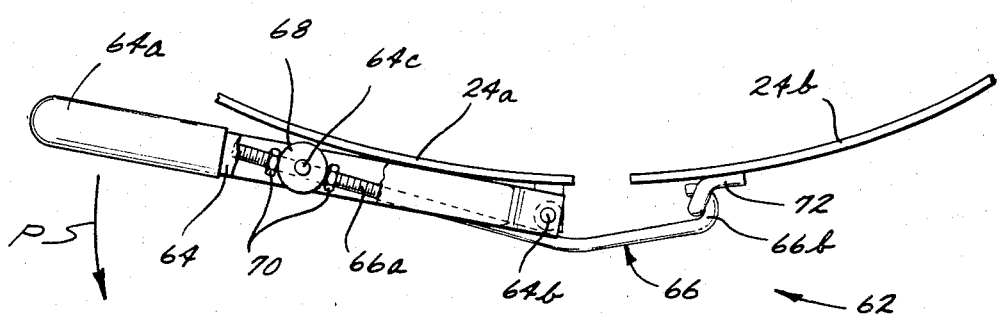
FIG. 3 is a top elevational view, partly in section, of the latching assembly utilized to secure an object to the load supporting mechanism.

The latch mechanism 62, which is basically an over-center type mechanism, is shown in more detail in FIG. 3. The latch mechanism includes a lever arm 64 having a handle portion 64a at one end thereof and having an opposite end pivotally mounted to the arcuate portion 24a at 64b. A latching element 66 includes a threaded end portion 66a which is inserted into a pin 68 pivotally mounted to an intermediate portion of the lever 64. The threaded end portion is secured to the pin 68 by means of locking nuts 70. The opposite end of the latching element has a hook 66b adapted to be releasably secured to an eyelet 72 secured to the arcuate portion 24b.

In operation, the lever 64 is pivoted outwardly from the arcuate portion 24a about the pivot point 64b (as represented by direction arrow P in FIG. 3) to release the hook 66b from the eyelet 72. The two arcuate portions 24a and 24b can then be pivoted away from one another and the hand truck 10 can be moved into position so that an object is adjacent the vertically extending frame members 50a and 50b of the load supporting mechanism 18. The object can be a compressed gas storage tank, for example. The securing strap arcuate portions 24a and 24b can then be positioned around the object and the latch mechanism 62 can be locked into position such that the securing strap 24 urges the object securely against the frame members 50a and 50b. The length of the latching element 66 and thus the holding force of the securing strap 24 can be adjusted by means of the locking nuts 70. Also, the length of the latching element 66 can be adjusted by the locking nuts 70 to enable the securing strap 24 to accommodate cylindrical objects of different diameters.

Figure 2:
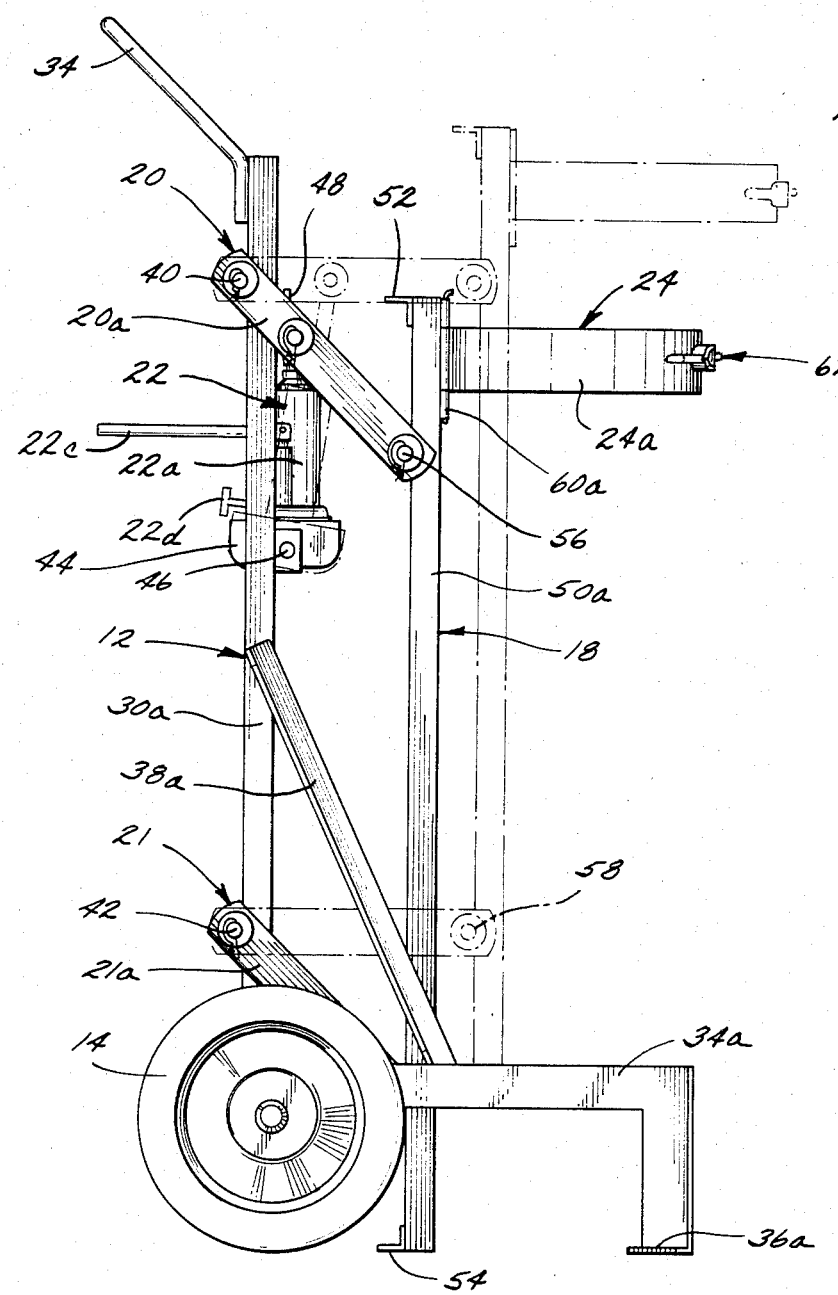
FIG. 2 is a side elevational view of the hand truck apparatus of FIG. 1.

Next, the object can be moved to a selected elevated position by actuating the handle 22c of the hydraulic jack unit 22. Each time the handle is actuated, the piston 22b is urged upwardly a predetermined amount, causing the lift member 48 to move the load supporting mechanism 18 and the attached object upwardly. The upper and lower linkage assemblies 20 and 21 maintain the support members 50a and 50b in a relatively vertical relationship with the ground. After the load supporting mechanism 18 has been raised, it will be in a position as shown in phantom in FIG. 2. The object can be lowered by means of the release handle 22d.

While the securing strap assembly 24 shown in the drawings is specifically adapted to secure a cylindrical object to the load supporting mechanism 18, it will be appreciated that other types of securing means can be utilized to engage the sidewalls of an object and urge the object into secure engagement with the load supporting mechanism. For example, a commercially available securing system comprising a strap formed of a flexible plastic webbing and a manually actuated ratchet mechanism can be used to retain objects of varying cross-sectional sizes in secure engagement with the load supporting mechanism.

In accordance with the provisions of the patent statutes, the principle and mode of operation of the invention have been described in what is considered to represent its preferred embodiment. However, it should be noted that the invention may be practiced otherwise than as specifically illustrated and described without departing from its spirit or scope.

What is claimed is:

1. A hand truck apparatus for elevating and transporting an object comprising:
   a main frame assembly having ground engaging wheel means;
   a load supporting mechanism movably mounted on said main frame assembly, said load supporting mechanism being movable between a first lower position and a second upper position, said load supporting mechanism including a generally elongate frame member for engaging the object along a first predetermined length of the sidewall of the object, said load supporting mechanism including securing means for engaging a portion of the sidewall of the object along a second predetermined length of the sidewall of the object, said securing means urging the object into secure engagement with said elongate frame member, said first predetermined length being greater than said second predetermined length; and
   means for moving said load supporting mechanism and the object between the first lower position and the second upper position.

2. The hand truck apparatus according to claim 1 including linkage means for movably mounting said load supporting mechanism in spaced apart relationship with said main frame assembly, said linkage means adapted to maintain said elongate frame member in generally vertical relationship as said load supporting meachanism is moved between the lower and upper positions.

3. The hand truck apparatus according to claim 1 wherein said securing means includes a securing strap for encompassing the object.

4. The hand truck apparatus according to claim 1 wherein said means for moving includes a jack means mounted on said main frame assembly and coupled to said load supporting mechanism.

5. The hand truck apparatus according to claim 1 wherein said wheel means includes a pair of spaced apart wheels.

6. The hand truck apparatus according to claim 5 wherein said wheels are spaced apart by a first predetermined distance and said main frame assembly includes a pair of outwardly extending legs each provided with a separate ground engaging foot portion, said foot portions spaced apart by a second predetermined distance greater than said first predetermined distance, said legs cooperating with said wheel means for supporting the hand truck apparatus.

* * * * *